(12) United States Patent
Dattelbaum et al.

(10) Patent No.: US 8,395,123 B2
(45) Date of Patent: Mar. 12, 2013

(54) FLUORESCENT SINGLE WALLED NANOTUBE/SILICA COMPOSITE MATERIALS

(75) Inventors: Andrew M. Dattelbaum, Los Alamos, NM (US); Gautam Gupta, Los Alamos, NM (US); Juan G. Duque, Los Alamos, NM (US); Stephen K. Doorn, Los Alamos, NM (US); Christopher E. Hamilton, Los Alamos, NM (US); Kimberly A. DeFriend Obrey, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 12/888,260

(22) Filed: Sep. 22, 2010

(65) Prior Publication Data

US 2012/0068071 A1    Mar. 22, 2012

(51) Int. Cl.
*G01J 5/02* (2006.01)
(52) U.S. Cl. ......................................................... 250/340
(58) Field of Classification Search .................... 250/340
See application file for complete search history.

(56) References Cited

U.S. PATENT DOCUMENTS

| | | | | |
|---|---|---|---|---|
| 7,374,649 B2 * | 5/2008 | Jagota et al. | ................. | 204/456 |
| 7,632,481 B2 * | 12/2009 | Khabashesku et al. | ..... | 423/447.1 |
| 7,759,749 B2 * | 7/2010 | Tanikawa | ..................... | 257/416 |
| 7,816,709 B2 * | 10/2010 | Balzano et al. | ............... | 257/213 |

OTHER PUBLICATIONS

Duque et al., "Environmental and synthesis-dependent luminescence properties of individual single-walled carbon nanotubes," Jul. 13, 2009, ACSNANO, vol. 3, No. 8, pp. 2153-2156.*

Kucheyev et al., "Mechanically robust, conductive carbon nanotube-based aerogels and their composites," Apr. 2010, Symposium R: Carbon Nanotubes and Related Low-Dimensional Materials, pp. 1-68.*

Duque, J.G., et al, "New Route to Fluorescent Single-Walled Carbon Nanotube/Silica Nanocomposites: Balancing Fluorescence Intensity and Environmental Sensitivity", J. Phys. Chem., 2011, 115, pp. 15147-15153.

Duque, J.G., et al., "Environmental and Synthesis-Dependent Luminescence Properties of Individual Single-Walled Carbon Nanotubes", Amer. Chem Soc., 2009, vol. 3. No. 8, pp. 2153-2156.

Whitsitt, E.A., et al., "LPD Silica Coating of Individual Single Walled Carbon Nanotubes", J. Mater. Chem., 2005, vol. 15, pp. 4678-4687.

Zamora-Ledezma, C., et al., "Photoluminescent Single Wall Carbon Nanotube-Silica Composite Gels", 2008, Carbon, vol. 46. pp. 1253-1269.

* cited by examiner

*Primary Examiner* — Kiho Kim
(74) *Attorney, Agent, or Firm* — Samuel L. Borkowsky

(57) ABSTRACT

Fluorescent composites of surfactant-wrapped single-walled carbon nanotubes (SWNTs) were prepared by exposing suspensions of surfactant-wrapped carbon nanotubes to tetramethylorthosilicate (TMOS) vapor. Sodium deoxycholate (DOC) and sodium dodecylsulphate (SDS) were the surfactants. No loss in emission intensity was observed when the suspension of DOC-wrapped SWNTs were exposed to the TMOS vapors, but about a 50% decrease in the emission signal was observed from the SDS-wrapped SWNTs nanotubes. The decrease in emission was minimal by buffering the SDS/SWNT suspension prior to forming the composite. Fluorescent xerogels were prepared by adding glycerol to the SWNT suspensions prior to TMOS vapor exposure, followed by drying the gels. Fluorescent aerogels were prepared by replacing water in the gels with methanol and then exposing them to supercritical fluid drying conditions. The aerogels can be used for gas sensing.

26 Claims, 6 Drawing Sheets

FLUORESCENT SINGLE WALLED NANOTUBE/SILICA COMPOSITE MATERIALS

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to the preparation of fluorescent composites of single-walled carbon nanotubes ("SWNTs").

BACKGROUND OF THE INVENTION

Fluorescent composites of single-walled carbon nanotubes (SWNTs) in silica gel have near infrared emission intensities that are generally much weaker compared to the precursors from which the composites are formed.

The preparation of fluorescent silica gel composites of SWNTs with minimal loss of near infrared emission intensity compared to their precursors is desirable. The preparation of fluorescent xerogel and aerogel composites of SWNTs is also desirable because the composites would be stable in a dry environment and might have applications in gas sensing.

SUMMARY OF THE INVENTION

In accordance with the purposes of the present invention, as embodied and broadly described herein, the present invention includes a fluorescent composite comprising SWNTs wrapped in surfactant in a silica gel matrix. The surfactant may comprise deoxycholate.

The invention also includes a process for preparing a fluorescent composite that involves preparing an aqueous suspension of single-walled carbon nanotubes in an aqueous solvent with a deoxycholate surfactant, and exposing the aqueous suspension to vapor of tetramethylorthosilicate, whereby a rigid fluorescent composite of deoxycholate-wrapped single-walled carbon nanotubes in a silica gel matrix is formed.

The invention also includes a process for preparing a fluorescent composite of single-walled carbon nanotubes wrapped in dodecylsulphate in a silica gel matrix. The process includes preparing an aqueous suspension of single-walled carbon nanotubes in an aqueous solvent with dodecylsulphate, and exposing the aqueous suspension to vapor of tetramethylorthosilicate, whereby a rigid composite of single-walled carbon nanotubes wrapped in dodecylsulphate surfactant is formed in a silica gel matrix.

The invention also includes a fluorescent xerogel composite of single-walled carbon nanotubes in a silica gel matrix and a process for making the xerogel. The process includes preparing a suspension of single-walled carbon nanotubes in an aqueous solvent with a polyalcohol (glycerol, for example) and a surfactant, and then exposing the aqueous suspension to vapor of tetramethylorthosilicate. The tetramethylorthosilicate hydrolyzes and the gel that is formed is dried until a fluorescent xerogel of single-walled carbon nanotubes in silica is produced.

The invention also includes an aerogel composite of single-walled carbon nanotubes in a silica matrix, and a process for making the aerogel. The process includes preparing an aqueous suspension of single-walled carbon nanotubes and a surfactant and then exposing the aqueous suspension to tetramethylorthosilicate and a base to form a first gel. The first gel is exposed to methanol, which replaces water in the first gel to form a second gel. The second gel is dried with a supercritical solvent until an aerogel of single-walled carbon nanotubes in silica is produced. Supercritical solvents include, but are not limited to, supercritical carbon dioxide, methanol, ethanol, and acetone.

The invention also includes a process of sensing gas phase molecules. The process includes preparing an aqueous suspension of single-walled carbon nanotubes and a surfactant, and exposing the aqueous suspension to tetramethylorthosilicate vapor to form a first gel. The first gel is exposed to methanol, which replaces water in the first gel to form a second gel. The second gel is dried with a supercritical solvent to form an aerogel of single-walled carbon nanotubes and silica (supercritical solvents include, but are not limited to, supercritical carbon dioxide, methanol, ethanol, and acetone). The fluorescence of the aerogel is measured in a first dielectric medium comprising a vacuum. The medium is changed to a second dielectric medium comprising a gas, and the fluorescence from the aerogel is measured with the aerogel in the second dielectric medium, and the fluorescence measurements are compared.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The invention relates to fluorescent silica composites of surfactant-wrapped SWNTs and to the preparation of the composites from aqueous suspensions of surfactant-wrapped SWNTs. The surfactant molecules individualize the SWNTs by wrapping around the SWNTs, which separates the SWNTs from each other in the suspension. The individualized SWNTs, exhibit near-infrared emission photoluminescence (PL) signals that depend on the chiralities of the SWNTs. When a rigid composite is formed from the suspension, the positions of the SWNTs and the surfactant become fixed, or at least move very slowly.

The SWNTs were prepared by the well-known $HIP_{CO}$ process involving the catalytic decomposition of carbon monoxide. Sodium deoxycholate (DOC) and sodium dodecylsulphate (SDS) were used as surfactants. Aqueous suspensions of DOC-wrapped SWNTS and aqueous suspensions of SDS-wrapped SWNTs exhibit emission signals in the near infrared region of the electromagnetic spectrum. The signals depend on the chiralities of the SWNTs.

The near infrared emission intensities for composites of SWNTs have been reported to be weaker in comparison to corresponding intensities of the precursors used to prepare the composites. This invention provides composites of SWNTs while minimizing loss of near infrared emission intensities compared to the precursors.

In an embodiment, there was no measurable decrease in the near infrared emission intensity for a composite gel formed from an aqueous suspension of surfactant-wrapped SWNTs when the surfactant was DOC.

In another embodiment, there was a decrease in near emission intensity of approximately 50% when a gel composite of surfactant-wrapped SWNTs was formed from the aqueous suspension when the surfactant was SDS.

In another embodiment, there was a decrease in near emission intensity of less than 10% when a gel composite of surfactant-wrapped SWNTs was formed from a buffered aqueous suspension when the surfactant was SDS.

The gel composites were used to prepare xerogels by drying the gel composites at a high enough temperature (80° C., for example) to remove water from the gel and form a xerogel of SWNTs in silica. In an embodiment, the polyalcohol glycerol was added to a suspension of SWNT prior to heating. Gels prepared from DOC-wrapped SWNTs were dried out by heating at 80° C. to remove water. The resulting silica xerogel was fluorescent.

The gel composites were also used to prepare aerogels. In an embodiment, a composite gel of SWNTs was converted to an aerogel by exposing the gel to methanol, which replaced water in the gel with methanol. This methanol-substituted gel was dried with a supercritical fluid, for example carbon dioxide to produce a fluorescent silica aerogel containing SWNTs. Other supercritical fluids such as, but not limited to, methanol, ethanol, and acetone, may also be used.

Figure 1B:
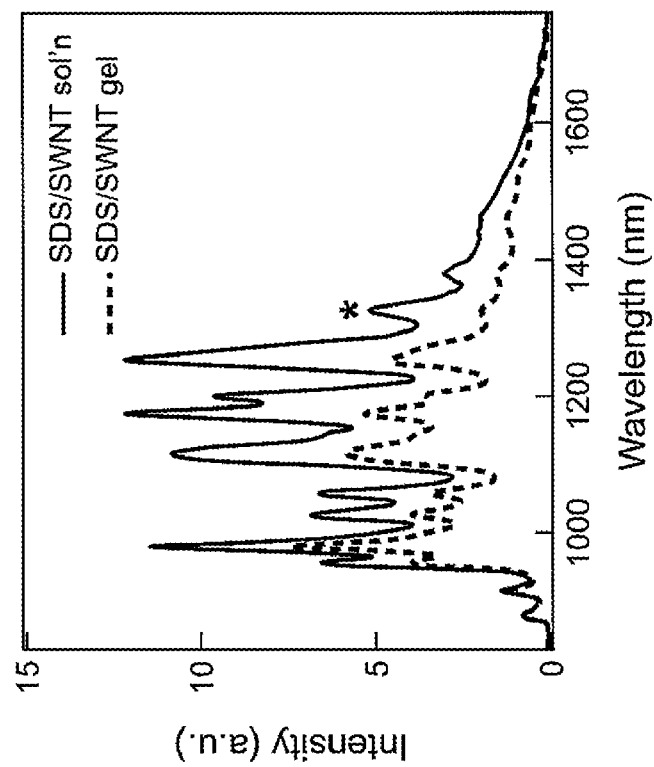
FIG. 1b is a fluorescence spectrum of an unbuffered aqueous suspension at pH approximately 7 of SDS-wrapped SWNTs (SDS=sodium dodecylsulphate) (solid line) and a fluorescence spectrum of a gel prepared from the suspension (dashed line). The emission from the (9,7) SWNT is starred.
Figure 1A:
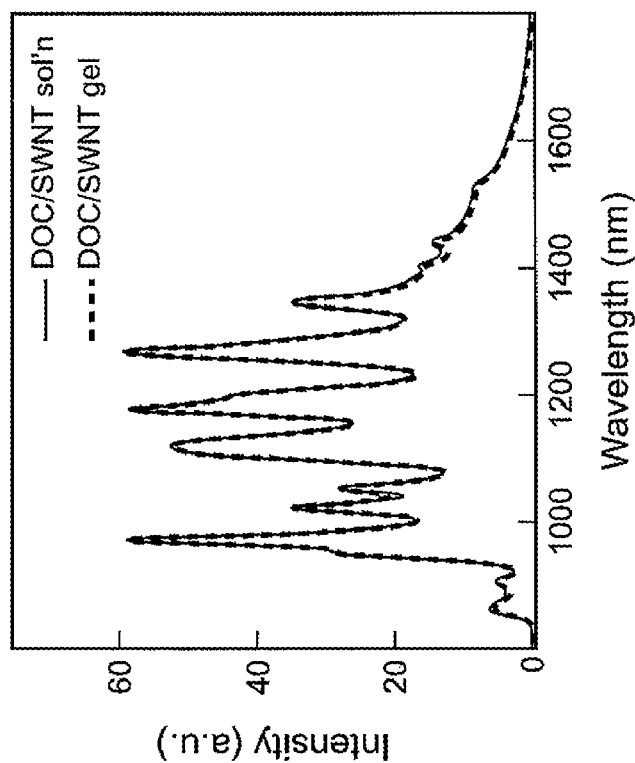
FIG. 1a shows a fluorescence spectrum of an unbuffered aqueous suspension of DOC-wrapped SWNTs (DOC=sodium deoxycholate) (solid line), and fluorescence spectrum of a gel formed from the suspension (dashed line).

More detailed descriptions of various embodiments of this invention are now described, beginning with the preparation of a rigid gel composite of DOC-wrapped SWNTs. First, an aqueous suspension of unbuffered DOC-wrapped SWNTs was prepared. A plot of the near infrared emission of the suspension is shown in FIG. 1a. The aqueous suspension was exposed to vapor from tetramethylorthosilicate (TMOS) for 1-2 hours, and then transferred to a capped vessel at room temperature. In approximately one day, a rigid gel composite of DOC-wrapped SWNTs and silica was formed in the capped vessel. A plot of the near infrared emission of the gel composite is also shown in FIG. 1a. The x-axis (i.e. wavelength) overlaps for the suspension and the gel composite, which makes it possible to directly compare the near-infrared emission intensities for the precursor suspension with those of the product gel. As FIG. 1a shows, there was no measurable loss in emission intensity when the aqueous suspension of DOC-wrapped SWNTs was converted to a gel composite.

A rigid gel composite of SDS-wrapped SWNTs was also prepared but in this case from an aqueous suspension of SDS-wrapped SWNTs (SDS=sodium dodecylsulphate). FIG. 1b shows a fluorescence spectrum of the near infrared emission from the aqueous suspension of SDS-wrapped SWNTs. This suspension was converted to a gel by exposure to TMOS vapor. A fluorescence spectrum of the near infrared emission of this gel is also plotted in FIG. 1b. As FIG. 1b shows, most of the emission features are maintained in the gel but the emission intensity decreased by approximately 50% for the gel compared to the aqueous suspension. Larger diameter SWNTs, which emit at longer wavelengths, display a relatively larger decrease in intensity compared to smaller diameter SWNTs. Compare, for example, the emission peaks for the (9,7) SWNTs, which is the starred peak at approximately 1322 nm in FIG. 1b. This behavior is typical of SWNT solutions that undergo a drop in the pH. Without wishing to be bound to any particular theory or explanation, it is believed that protons interact more strongly with the larger diameter SWNTs than with the smaller diameter SWNTs, which causes a preferential bleaching of their emission signals. In this embodiment, the initial pH of the aqueous suspension of SDS-SWNTs was measured to be 7, but after exposure to TMOS vapor for 1 hour, the pH dropped to 5.5, which is consistent with the emission spectrum shown in FIG. 1b. By contrast, no loss of emission from any of the SWNT chiralities was observed from DOC-wrapped SWNTs encapsulated in silica (FIG. 1a), although a drop in pH was measured. These results suggest that protons interact with SWNTs that are encapsulated by SDS, but with SWNTS encapsulated by DOC. These experiments were done using 1% surfactant. It was found that larger percentages of SDS in the suspensions did not result in an increase in the photoluminescence (PL) upon silica encapsulation.

Figure 2:
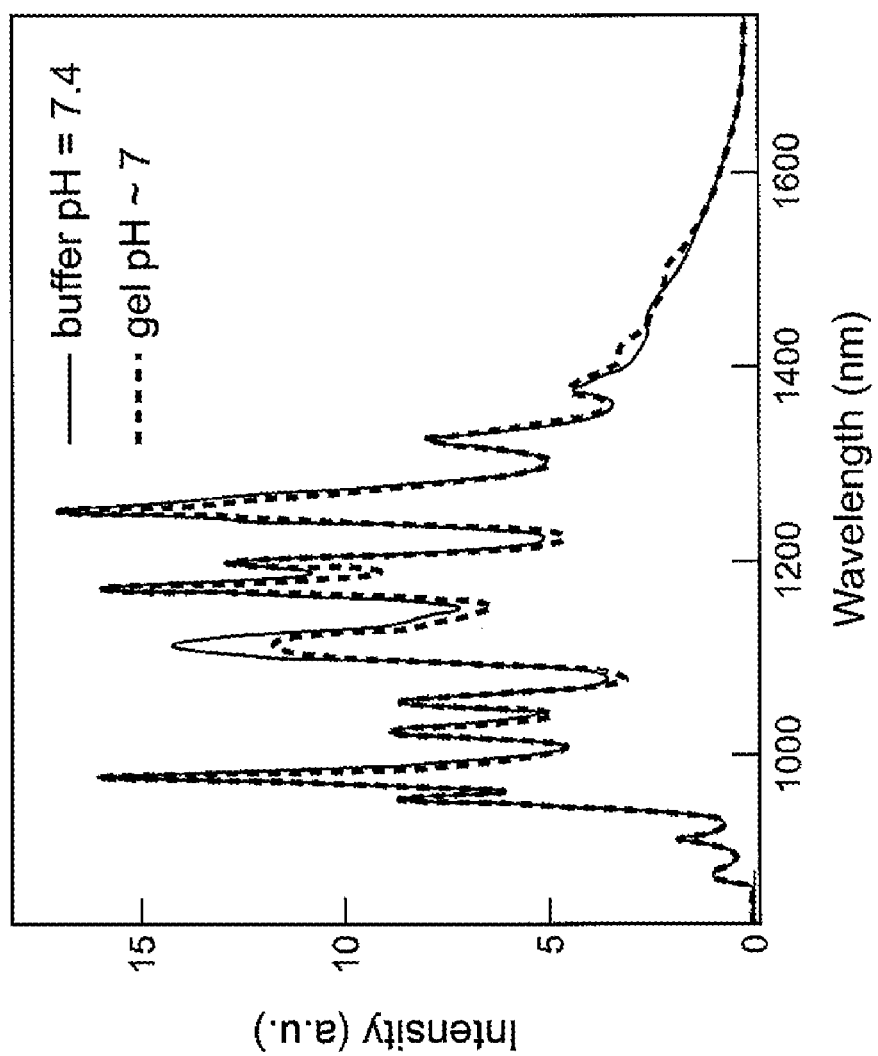
FIG. 2 shows fluorescence spectra of a buffered aqueous suspension of SDS-wrapped SWNTs at pH=7 (solid line) and a gel prepared from the buffered SWNT suspension (dashed line).

An attempt was made to mitigate the effects that a drop in pH has on the near infrared emission from the SDS-wrapped SWNTs by buffering the suspension to a pH of 7.4 with a 0.1 M NaCl phosphate buffer. In buffered suspensions, less than a 0.5 unit drop in pH was observed after exposure to TMOS vapors. In FIG. 2, emission spectra for the buffered suspension of SDS-wrapped SWNTs and the gel composite formed from the buffered suspension are shown. As shown in FIG. 2, only a drop of approximately 10% in emission was observed upon formation of a gel of silica around the buffered SDS/SWNT suspension. It is believed that the observations may be explained by a reorganization of the SDS molecules around the SWNTs. This reorganization of the SDS surfactant molecules may be a result of a conformation change of the SDS molecules due to interactions between cations from the buffer and the negatively charged SDS head groups.

Figure 3:
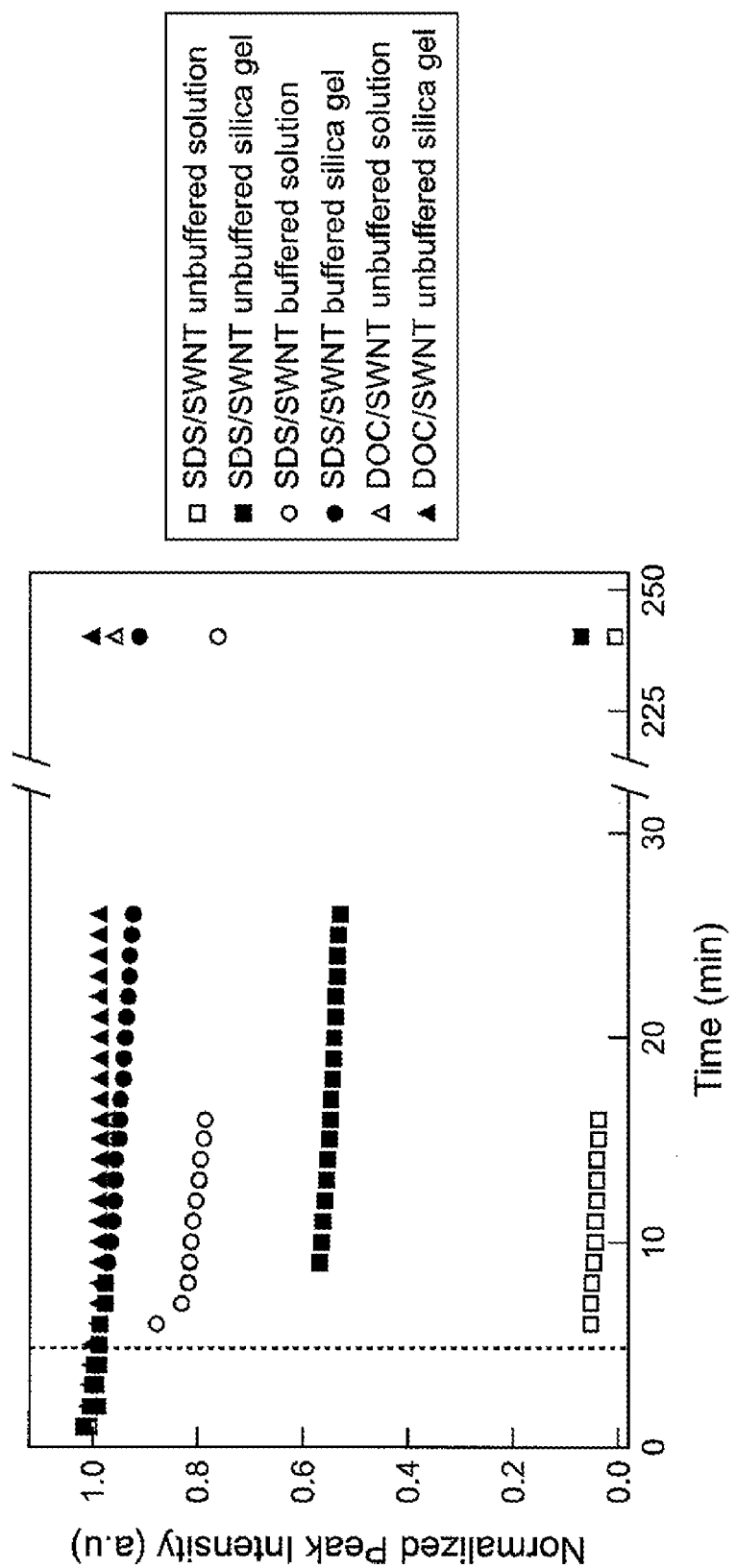
FIG. 3 shows a plot of fluorescence data for various surfactant-wrapped SWNTs in suspension and embedded in silica gel after exposing them to azobenzene. The data are represented as follows: SDS/SWNT (unbuffered suspension, empty squares), SDS/SWNT (unbuffered silica gel, filled squares), SDS/SWNT (buffered suspension, empty circles), SDS/SWNT (buffered silica gel, filled circles), DOC/SWNT (unbuffered suspension, empty triangles), DOC/SWNT (unbuffered silica gel, filled triangles). Buffered suspensions were prepared at pH approximately 7. The dashed line indicates the time at which the AB complex was added to the suspensions or gels (time=5 minutes).

DOC-wrapped SWNTs and SDS-wrapped SWNTs were exposed to azobenzene (AB) type molecules that are known to bleach the emission signals from SWNTs in suspensions and in silica. Results are plotted in FIG. 3 as overall integrated PL intensity as a function of time. In each experiment, several initial points were collected prior to adding the AB as a baseline. The aqueous unbuffered suspension of SDS-wrapped SWNTs (open squares) responded almost immediately with almost complete bleaching. The buffered suspension of SDS-wrapped SWNTs (open circles) responded quickly, losing approximately 20% of their overall emission intensity in 30 minutes. Near complete quenching was observed after several hours. By contrast, for the aqueous suspension of DOC-wrapped SWNTs, (open triangles) less than 5% of the emission intensity was bleached. Furthermore, when the aqueous suspension was converted to a gel composite, the gel composite was affected even less by the AB type molecules. These results suggest that that the surfactant molecules in the gel were not as mobile as those in the suspension. This decrease in mobility of the surfactant molecules now embedded in the gel matrix limited the ability of AB to interact with the surfactant-wrapped SWNTs.

The composite gels of surfactant-wrapped SWNTs were dried out to form xerogels. Each composite gel was first dried in air then placed in an oven at 80° C. to remove the residual water from the gel composite. The gels shrunk significantly (approximately 90% volume decrease) upon drying. Less shrinkage was observed as TMOS exposure time to form the gel was increased, but these materials retained little of their fluorescence characteristics.

Figure 4:
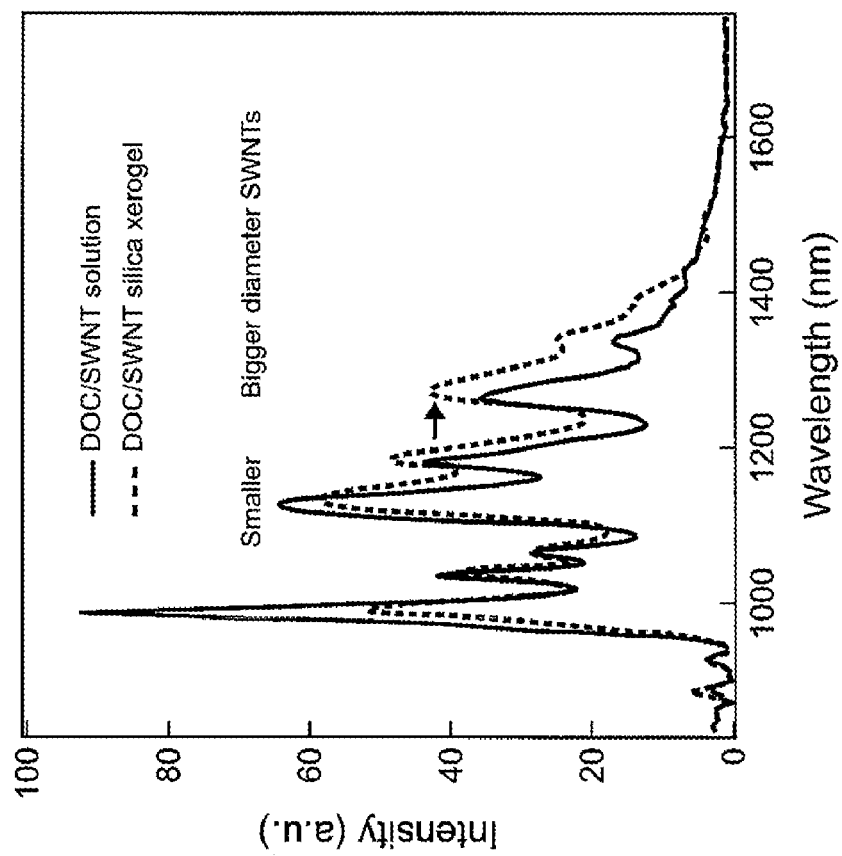
FIG. 4 shows fluorescence spectra from a DOC/SWNT suspension with 10 weight percent glycerol added (solid line) and a silica xerogel (dashed line) prepared from the DOC/SWNT suspension with glycerol having been exposed to TMOS vapor then dried out at 80° C. for 2 days.

Fluorescent silica xerogels were prepared by adding glycerol to the precursor surfactant-wrapped SWNT suspension and exposing the suspension to TMOS vapor for longer than 1 hour, and then allowing the exposed suspension to gel. The resulting gels were left in air for at least a week to allow for condensation of the silica framework and evaporation of water from the gel composite. The gels shrunk in size upon drying depending on the time exposure to TMOS vapor. However, because glycerol does not evaporate at room temperature and atmospheric pressure, it remains inside the silica xerogel. Thus, less shrinkage was observed for samples having glycerol. As shown in FIG. 4, these silica xerogel materials were found to have similar fluorescence intensity as that observed from the precursor SWNT suspension. Interestingly, the intensity changes observed depended on SWNT diameter: smaller diameter SWNTs lost intensity while larger diameter SWNTs gained intensity. In addition, there was an observed red shift that was more pronounced for the larger diameter SWNTs.

Figure 5:
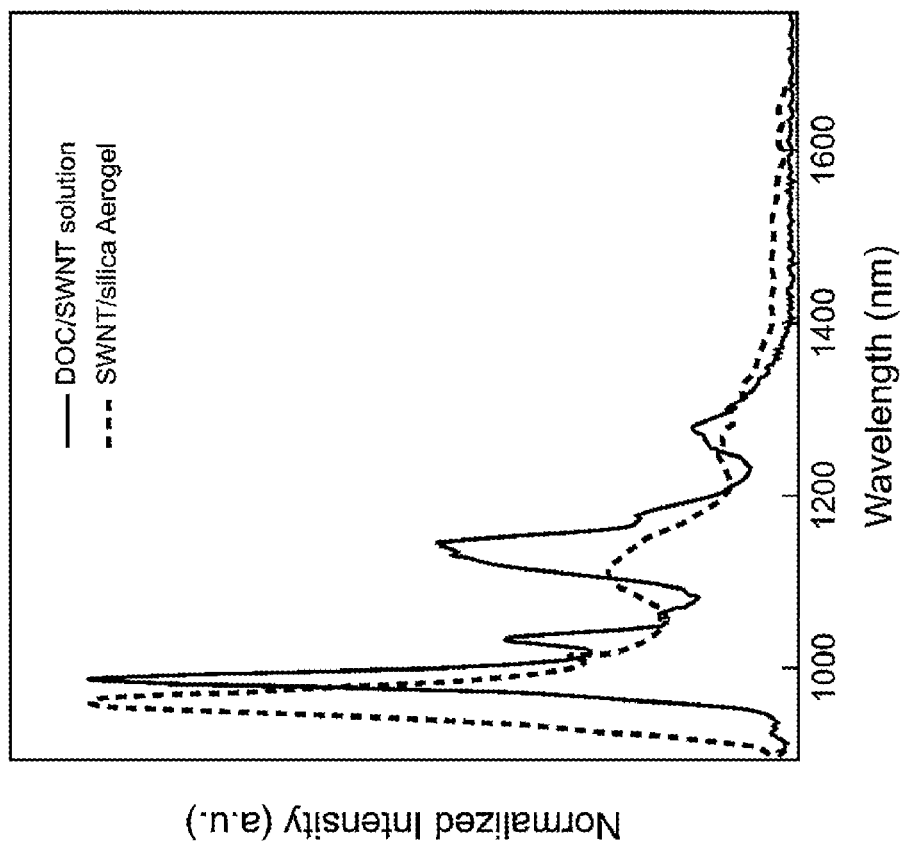
FIG. 5 shows normalized fluorescence spectra from a DOC/SWNT suspension (solid line) and the resulting silica aerogel made from this suspension (dashed line).

Gel composites prepared from suspensions of deoxycholate-wrapped SWNTs were converted to monolithic aerogels using a variety of supercritical fluids, such as carbon dioxide, methanol and ethanol. The resulting SWNT aerogels were low-density materials with significant near-infrared emission intensity (see FIG. 5). Although these aerogels were fluorescent, they lost approximately 40% of the initial intensity compared to the precursor suspension. Furthermore, the emission for the SWNT-aerogel is blue-shifted 30 nm from the precursor suspension. These emission features suggest that emission from SWNTs encapsulated in aerogels is not significantly affected by the surrounding matrix.

Figure 6:
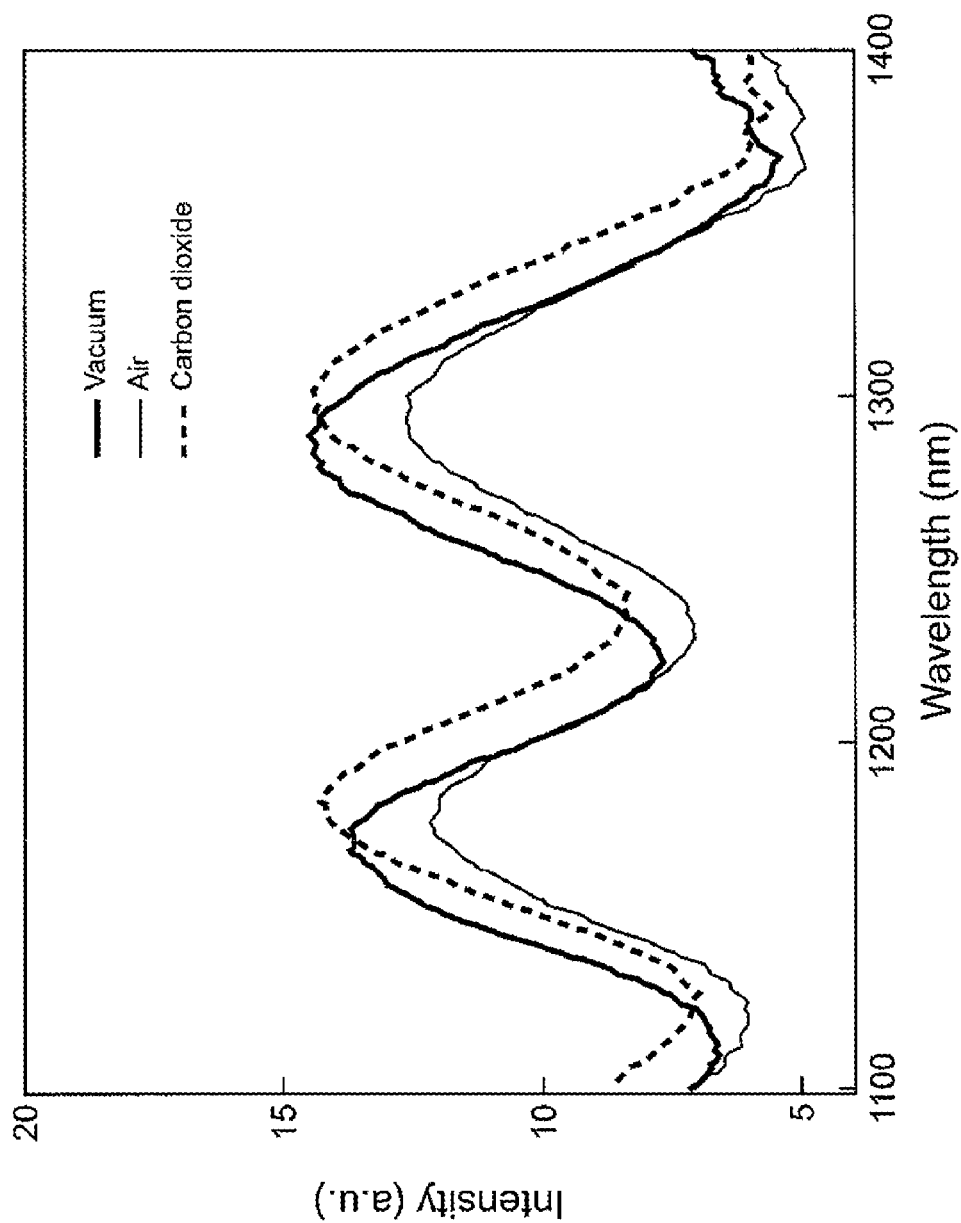
FIG. 6 shows fluorescence spectra from a SWNT/aerogel collected in vacuum (solid line), air (dotted line) and carbon dioxide (dashed line).

The aerogels prepared from suspensions of DOC-wrapped SWNTs were also found to have changes in their fluorescence spectra as the dielectric medium surrounding the nanotubes was changed from air to vacuum to carbon dioxide as shown in FIG. 6. Changes in both intensity and peak position were observed. These changes may be used for sensing. Thus, the aerogels are sensors capable of identifying a particular gas or gas mixture in contact with the aerogel.

In the EXAMPLES below, the SWNTs were synthesized by high-pressure decomposition of carbon monoxide ($HiP_{CO}$) and used after purification by ultracentrifugation. Fluorescence spectra were recorded using a NIR fluorimeter based on a Thermo NICOLET NXR 9600 FTIR paired with a Ge detector. A Xe arc lamp passed through a monochrometer or a 785 nm diode laser were used as the excitation sources. Raman measurements were performed using a laser operating at 785 nm with a liquid nitrogen cooled CCD array using a single grating monochrometer. The laser power at the sample was 10-15 mW and Raman spectra were integrated over 10 seconds.

Example 1

A suspension of DOC-wrapped SWNTs was prepared as follows: an amount of approximately 40 milligrams of SWNTs in an amount of 180 mL $D_2O$ was shear mixed with 1 weight percent sodium deoxycholate (DOC) in $D_2O$, followed by ultrasonication and centrifugation at 140,000×g for 4 hours. This yielded an aqueous suspension of individualized SWNTs wrapped by DOC molecules.

Example 2

A suspension of SDS-wrapped SWNTs was prepared as follows: an amount of approximately 40 milligrams of SWNTs in an amount of 180 mL $D_2O$ was shear mixed for 2 hours with 1 weight percent sodium dodecylsulphate (SDS) in $D_2O$, followed by ultrasonication (4-8 minutes) and centrifugation at 140,000×g for 4 hours. This yielded an aqueous suspension of individualized SWNTs wrapped by SDS molecules.

Example 3

A gel composite of SWNTs was prepared from the suspension of DOC-wrapped SWNTs as follows: two containers, one containing a SDS-wrapped SWNT suspension (approximately 1 mL) and one containing tetramethylorthosilicate (TMOS, 0.5 mL, ALDRICH, 99+%) were placed in a sealed container having a diameter of approximately 6.5 cm and a height of approximately 2.5 cm for 1-6 hours at room temperature. During this time, TMOS vapor filled the sealed container and diffused into the suspension. The suspension that now contained the hydrolyzed TMOS (i.e. $Si(OH)_4$) was transferred to another container. Approximately 12 hours later, a rigid gel composite formed.

Example 4

A gel composite of SWNTs was prepared from the suspension of SDS-wrapped SWNTs as follows: two containers, one containing a SDS-wrapped SWNT suspension (approximately 1 mL) and one containing tetramethylorthosilicate (TMOS, 0.5 mL, ALDRICH, 99+%) were placed in a sealed container having a diameter of approximately 6.5 cm and a height of approximately 2.5 cm for 1-6 hours at room temperature. During this time, TMOS vapor filled the sealed container and diffused into the suspension. The suspension that now contained the hydrolyzed TMOS (i.e. $Si(OH)_4$) was transferred to another container. Approximately 12 hours later, a rigid gel composite formed.

Example 5

A gel composite of SWNTs was prepared from a buffered suspension of SDS-wrapped SWNTs as follows: two containers, one containing a SDS-wrapped SWNT suspension (approximately 1 mL with 5 microliters (uL) of 2M phosphate buffer (pH 7, 0.1 M NaCl)) and one containing tetramethylorthosilicate (TMOS, 0.5 mL, ALDRICH, 99+%) were placed in a sealed container having a diameter of approximately 6.5 cm and a height of approximately 2.5 cm for 0.5-1 hour at room temperature. During this time, TMOS vapor filled the sealed container and diffused into the suspension. The suspension that now contained the hydrolyzed TMOS (i.e. $Si(OH)_4$) was transferred to another container. Approximately 1 hour later, a rigid gel composite formed.

Example 6

A DOC-SWNT xerogel was prepared as follows: two containers, one containing a DOC-wrapped SWNT suspension (approximately 1 mL) and one containing tetramethylorthosilicate (TMOS, 0.5 mL, ALDRICH, 99+%) were placed in a sealed container having a diameter of approximately 6.5 cm and a height of approximately 2.5 cm for 1-6 hours at room temperature. During this time, TMOS vapor filled the sealed container and diffused into the suspension. The suspension that now contained the hydrolyzed TMOS (i.e. $Si(OH)_4$) was transferred, to another container. Approximately 12 hours later, a rigid gel formed. The rigid gel was then exposed to air for at least 2 days to allow water to evaporate from the composite gel. During this time significant shrinkage (~90%) of the gel occurred resulting in a solid glass-like material. These xerogels were heated to 80° C. for 1-2 days to remove residual water.

Example 7

A DOC-SWNT xerogel with glycerol was prepared as follows: two containers, one containing a DOC-wrapped SWNT suspension (approximately 1 mL) with 5-50 weight percent glycerol and one containing tetramethylorthosilicate (TMOS, 0.5 mL, ALDRICH, 99+%) were placed in a sealed container having a diameter of approximately 6.5 cm and a height of approximately 2.5 cm for 1-6 hours at room temperature. During this time, TMOS vapor filled the sealed container and diffused into the suspension. The suspension that now contained the hydrolyzed TMOS (i.e. $Si(OH)_4$) was transferred to another container. Approximately 12 hours later, a rigid gel formed. The rigid gel was then exposed to air for 2 days to allow water to evaporate from the composite gel. During this time significant shrinkage of the gel occurred. The amount of shrinkage depends on the concentration of glycerol in the sample, i.e., more glycerol resulted in less shrinkage and a more rubber-like material. As glycerol is decreased, the resulting solid was a harder glass-like material with up to 90% shrinkage. The xerogels were heated to 80° C. for 1-2 days to remove residual water.

Example 8

A SWNT aerogel was prepared as follows: two containers, one containing a surfactant-wrapped (DOC) SWNT suspension (approximately 1 mL) with 0-50 weight percent glycerol and one containing tetramethylorthosilicate (TMOS, 0.5 mL, ALDRICH, 99+%) were placed in a sealed container having a diameter of approximately 6.5 cm and a height of approximately 2.5 cm for 1-6 hours at room temperature. During this time, TMOS vapor filled the sealed container and diffused into the suspension. The suspension that now contained the hydrolyzed TMOS (i.e. $Si(OH)_4$) was transferred to a cylindrical mold. Approximately 12 hours later, a rigid gel formed. After gelation, the water was exchanged with methanol, which took approximately 2-3 days. The resulting gel was dried using supercritical carbon dioxide in a POLARON critical point dryer (QUORUM TECHNOLOGIES, Ltd., West Sussex, UK), resulting in negligible shrinkage.

Example 9

A SWNT aerogel was prepared as follows: two containers, one containing a surfactant-wrapped (DOC) SWNT suspension (approximately 1 mL) with 0-50 weight percent glycerol and one containing tetramethylorthosilicate (TMOS, 0.5 mL, ALDRICH, 99+%) were placed in a sealed container having a diameter of approximately 6.5 cm and a height of approximately 2.5 cm for 1-6 hours at room temperature. During this time, TMOS vapor filled the sealed container and diffused into the suspension. The suspension that now contained the hydrolyzed TMOS (i.e. $Si(OH)_4$) was transferred to a cylindrical mold. Approximately 12 hours later, a rigid gel formed. After gelation, the water was exchanged with methanol, which took approximately 2-3 days. The resulting gel was dried using supercritical methanol in a custom reactor from OCELLUS Inc. (Livermore, Calif.), resulting in negligible shrinkage.

Example 10

A SWNT aerogel was prepared as follows: two containers, one containing a surfactant-wrapped (DOC) SWNT suspension (approximately 1 mL) and one containing tetramethylorthosilicate (TMOS, 0.5 mL, ALDRICH, 99+%) were placed in a sealed container having a diameter of approximately 6.5 cm and a height of approximately 2.5 cm for 1-6 hours at room temperature. During this time, TMOS vapor filled the sealed container and diffused into the suspension. The suspension that now contained the hydrolyzed TMOS (i.e. $Si(OH)_4$) was transferred to a cylindrical mold. Approximately 12 hours later, a rigid gel formed. After gelation the water was exchanged with methanol for 2-3 days. Samples were then dried using supercritical carbon dioxide in a POLARON critical point dryer (QUORUM TECHNOLOGIES, LTD., West Sussex, UK). All samples showed negligible shrinkage. The SWNT aerogel was then placed in a custom built vacuum chamber to measure its fluorescence spectrum in changing dielectric environments. The fluorescence spectrum was measured in air, then put under vacuum to remove air and a second fluorescence measurement was collected. Carbon dioxide was then introduced to the SWNT aerogel and another fluorescence spectrum was collected. Differences in both peak position and intensity were observed as the dielectric medium was changed.

Example 11

A SWNT aerogel was prepared as follows: two containers, one containing a surfactant-wrapped (DOC) SWNT suspension (approximately 1 mL) with 5-50 weight percent glycerol added and one containing tetramethylorthosilicate (TMOS, 0.5 mL, ALDRICH, 99+%) were placed in a sealed container having a diameter of approximately 6.5 cm and a height of approximately 2.5 cm for 1-6 hours at room temperature. During this time, TMOS vapor filled the sealed container and diffused into the suspension. The suspension that now contained the hydrolyzed TMOS (i.e. $Si(OH)_4$) was transferred to a cylindrical mold. Approximately 12 hours later, a rigid gel formed. After gelation the water was exchanged with methanol for 2-3 days. Samples were then dried using methanol in a custom reactor from OCELLUS Inc. (Livermore, Calif.). All samples showed negligible shrinkage. The SWNT aerogel was then placed in a custom built vacuum chamber to measure its fluorescence spectrum in changing dielectric environments. The fluorescence spectrum was measured in air, then put under vacuum to remove air and a second fluorescence measurement was collected. Carbon dioxide was then introduced to the SWNT aerogel and another fluorescence spectrum was collected. Differences in both peak position and intensity were observed as the dielectric medium was changed.

Example 12

A SWNT aerogel was prepared as follows: TMOS (6.15 g, SIGMA-ALDRICH) and 0.02 M ammonium hydroxide (4.5 g, FISHER SCIENTIFIC) were combined with a DOC-wrapped SWNT aqueous suspension. The gel precursor was poured into a cylindrical mold (h=1 cm, d=3 cm). Approximately 12 hours later, a rigid gel formed. After gelation the water was exchanged with methanol for 2-3 days. The sample was then dried using supercritical carbon dioxide in a POLARON critical point dryer (QUORUM TECHNOLOGIES, LTD., West Sussex, UK). The sample showed negligible shrinkage.

Example 13

A SWNT aerogel was prepared as follows: TMOS (6.15 g, SIGMA-ALDRICH) and 0.02 M ammonium hydroxide (4.5 g, FISHER SCIENTIFIC) were combined with a DOC-wrapped SWNT aqueous suspension. The gel precursor were poured into a cylindrical mold (h=1 cm, d=3 cm). Approximately 12 hours later, a rigid gel formed. After gelation the water was exchanged with methanol for 2-3 days. The resulting gel was dried using supercritical methanol in a custom reactor from OCELLUS Inc. (Livermore, Calif.), which resulted in negligible shrinkage.

Example 14

A SWNT aerogel was prepared as follows: TMOS (6.15 g, SIGMA-ALDRICH) and 0.02 M ammonium hydroxide (4.5 g, FISHER SCIENTIFIC) were combined with a DOC-wrapped SWNT aqueous suspension. The gel precursor were poured into a cylindrical mold (h=1 cm, d=3 cm). Approximately 12 hours later, a rigid gel formed. After gelation the water was exchanged with methanol for 2-3 days. Samples were then dried using supercritical carbon dioxide in a POLARON critical point dryer (QUORUM TECHNOLOGIES, LTD., West Sussex, UK). All samples showed negligible shrinkage. The SWNT aerogel was then placed in a custom built vacuum chamber to measure its fluorescence spectrum in changing dielectric environments. The fluorescence spectrum was measured in air, then put under vacuum to remove air and a second fluorescence measurement was collected. Carbon dioxide was then introduced to the SWNT aerogel and another fluorescence spectrum was collected. Differences in both peak position and intensity were observed as the dielectric medium was changed.

Example 15

A SWNT aerogel was prepared as follows: TMOS (6.15 g, SIGMA-ALDRICH) and 0.02 M ammonium hydroxide (4.5 g, FISHER SCIENTIFIC) were combined with a DOC-wrapped SWNT aqueous suspension. The gel precursor were poured into a cylindrical mold (h=1 cm, d=3 cm). Approximately 12 hours later, a rigid gel formed. After gelation the water was exchanged with methanol for 2-3 days. The resulting gel was dried using supercritical methanol in a custom reactor from OCELLUS Inc. (Livermore, Calif.), which resulted in negligible shrinkage. The SWNT aerogel was then placed in a custom built vacuum chamber to measure its fluorescence spectrum in changing dielectric environments. The fluorescence spectrum was measured in air, then put under vacuum to remove air and a second fluorescence measurement was collected. Carbon dioxide was then introduced to the SWNT aerogel and another fluorescence spectrum was collected. Differences in both peak position and intensity were observed as the dielectric medium was changed.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A process for preparing a fluorescent composite of single-walled carbon nanotubes wrapped in surfactant in a silica gel matrix, comprising:
    preparing an aqueous suspension of single-walled carbon nanotubes in an aqueous solvent with surfactant, and
    exposing the aqueous suspension to vapor of tetramethylorthosilicate, whereby a rigid fluorescent composite of single-walled carbon nanotubes in a silica gel matrix is formed.

2. The process of claim 1, wherein the surfactant comprises deoxycholate or dodecylsulphate.

3. The process of claim 1, wherein the aqueous suspension comprises a polyalcohol.

4. The process of claim 3, wherein the polyalcohol comprises glycerol.

5. The process of claim 1, wherein the aqueous suspension comprises a buffer.

6. The process of claim 5, wherein the buffer comprises phosphate and the pH of the aqueous suspension is approximately 7.00.

7. The process of claim 1, wherein the carbon nanotubes are prepared by decomposition of carbon monoxide.

8. A process for preparing a fluorescent composite of single-walled carbon nanotubes in a silica gel matrix, comprising:
    preparing a buffered aqueous suspension of single-walled carbon nanotubes with a dodecylsulphate surfactant and a buffer, and
    exposing the aqueous suspension to vapor of tetramethylorthosilicate, whereby a rigid composite of single-walled carbon nanotubes wrapped in dodecylsulphate in a silica gel matrix is formed.

9. The process of claim 8, wherein the buffered suspension comprises phosphate.

10. A process for preparing a fluorescent xerogel of single-walled carbon nanotubes and silica, comprising:
    preparing a suspension of single-walled carbon nanotubes in an aqueous solvent with glycerol and a surfactant,
    exposing the aqueous suspension to vapor of tetramethylorthosilicate whereby the tetramethylorthosilicate hydrolyzes to form a fluorescent composite, and
    drying the fluorescent composite to form a xerogel of carbon nanotubes and silica.

11. The process of claim 10, wherein the surfactant is selected from sodium deoxycholate and sodium dodecylsulphate.

12. A process for preparing a fluorescent aerogel of carbon nanotubes and silica, comprising:
preparing an aqueous suspension of single-walled carbon nanotubes and a surfactant;
exposing the aqueous suspension to tetramethylorthosilicate and a base to form a first gel,
exposing the first gel to methanol which replaces water in the first gel to form a second gel, and
drying the gel with supercritical fluid to form an aerogel of single-walled carbon nanotubes and silica.

13. The process of claim 12, wherein the surfactant is selected from sodium dodecylsulphate or sodium deoxycholate.

14. The process of claim 13, wherein the aqueous suspension of single-walled carbon nanotubes further comprises glycerol.

15. The process of claim 12, wherein the supercritical fluid comprises methanol, ethanol, or carbon dioxide.

16. A process for preparing a fluorescent aerogel of carbon nanotubes and silica, comprising:
preparing an aqueous suspension of single-walled carbon nanotubes and a surfactant;
exposing the aqueous suspension to tetramethylorthosilicate vapor to form a first gel,
exposing the first gel to methanol which replaces water in the first gel to form a second gel, and
drying the second gel with supercritical fluid to form an aerogel of single-walled carbon nanotubes and silica.

17. The process of claim 16, wherein the surfactant is selected from sodium dodecylsulphate or sodium deoxycholate.

18. The process of claim 16, wherein the aqueous suspension of single-walled carbon nanotubes further comprises glycerol.

19. A process for sensing a gas, comprising
preparing an aqueous suspension of single-walled carbon nanotubes and a surfactant;
exposing the aqueous suspension to tetramethylorthosilicate vapor to form a first gel,
exposing the first gel to methanol which replaces water in the first gel to form a second gel, and
drying the second gel with a supercritical fluid to form an aerogel of single-walled carbon nanotubes and silica,
measuring the fluorescence from the single-walled carbon nanotubes in the aerogel in a first dielectric medium comprising a vacuum,
changing the first dielectric medium to a second dielectric medium comprising a gas, and thereafter
measuring the fluorescence from the single walled carbon nanotubes in a second dielectric medium, and then
comparing the fluorescence from the aerogel in a vacuum with the fluorescence from the aerogel in a gas.

20. The process of claim 19, wherein the first dielectric medium comprises a vacuum.

21. The process of claim 19, wherein the second dielectric medium comprises air.

22. The process of claim 19, wherein the second dielectric medium comprises carbon dioxide.

23. A process for sensing a gas, comprising
preparing an aqueous suspension of single-walled carbon nanotubes and a surfactant,
exposing the aqueous suspension to tetramethylorthosilicate and a base to form a first gel,
exposing the first gel to methanol which replaces water in the first gel to form a second gel, and
drying the second gel with a supercritical fluid to form an aerogel of single-walled carbon nanotubes and silica,
measuring the fluorescence from the single-walled carbon nanotubes in the aerogel in a first dielectric medium comprising a vacuum,
changing the first dielectric medium to a second dielectric medium comprising a gas, and thereafter
measuring the fluorescence from the single walled carbon nanotubes in a second dielectric medium, and then
comparing the fluorescence from the aerogel in a vacuum with the fluorescence from the aerogel in a gas.

24. The process of claim 23, wherein the first dielectric medium comprises a vacuum.

25. The process of claim 23, wherein the second dielectric medium comprises air.

26. The process of claim 23, wherein the second dielectric medium comprises carbon dioxide.

* * * * *